(12) United States Patent
Laible

(10) Patent No.: US 12,319,330 B2
(45) Date of Patent: Jun. 3, 2025

(54) QUICK-CHANGE COMPONENT STORE FOR AUTO BODY PARTS

(71) Applicant: MTS Maschinenbau GmbH, Mengen (DE)

(72) Inventor: Eckhard Laible, Leinfelden-Schlechtenmühle (DE)

(73) Assignee: MTS Maschinenbau Gmbh, Mengen (DE)

( * ) Notice: Subject to any disclaimer, the term of this patent is extended or adjusted under 35 U.S.C. 154(b) by 27 days.

(21) Appl. No.: 17/815,321

(22) Filed: Jul. 27, 2022

(65) Prior Publication Data
US 2023/0050064 A1 Feb. 16, 2023

(30) Foreign Application Priority Data

Aug. 3, 2021 (DE) .................... 20 2021 104 136.6

(51) Int. Cl.
*B62B 3/00* (2006.01)
*B62B 3/04* (2006.01)
*B62B 5/06* (2006.01)
*B65G 1/14* (2006.01)

(52) U.S. Cl.
CPC ............... *B62B 3/005* (2013.01); *B62B 3/04* (2013.01); *B62B 5/061* (2013.01); *B65G 1/14* (2013.01)

(58) Field of Classification Search
CPC .......... B62B 3/005; B62B 3/04; B62B 5/061; B62B 2202/00; B62B 3/10; B62B 5/049; B62B 3/02; B65G 1/14
See application file for complete search history.

(56) References Cited

U.S. PATENT DOCUMENTS

| | | | | |
|---|---|---|---|---|
| 4,679,805 A | * | 7/1987 | Cunningham | B62B 3/00 108/91 |
| 4,712,691 A | * | 12/1987 | Grill | B65G 1/14 211/49.1 |
| 4,863,179 A | * | 9/1989 | Isaacs | B62B 3/00 280/33.996 |
| 5,005,712 A | * | 4/1991 | Niederprum | A47F 7/0042 53/244 |
| 5,016,893 A | * | 5/1991 | Hart, Jr. | B62B 3/10 211/195 |
| 5,411,234 A | * | 5/1995 | Schoeller | B65G 1/14 254/89 H |

(Continued)

FOREIGN PATENT DOCUMENTS

DE 3811310 C2 2/1994

*Primary Examiner* — Ko H Chan
(74) *Attorney, Agent, or Firm* — Bachman & LaPointe, P.C.

(57) ABSTRACT

Disclosed herein is a component storage device for workpieces which are mounted in stacking columns on or at pawls one above the other or next to one another characterized in that the stacking columns are arranged on a movable trolley. Also disclosed is a system for presenting workpieces with the component storage device characterized in that a coordinate system is assigned to the carriage. Further disclosed is a stacking column for storing workpieces on or at pawls one above the other or next to one another, the pawls being provided in or at a frame characterized in that the frame comprises at least two parts which are connected to one another in an articulated manner.

14 Claims, 6 Drawing Sheets

(56) References Cited

U.S. PATENT DOCUMENTS

| | | | | |
|---|---|---|---|---|
| 5,988,777 | A * | 11/1999 | Schoeller | B65G 1/14 |
| | | | | 312/190 |
| 6,390,759 | B1 * | 5/2002 | Novak | B62B 5/049 |
| | | | | 414/469 |
| 7,708,156 | B2 * | 5/2010 | Johnson | A47B 57/487 |
| | | | | 211/106 |
| 7,815,202 | B2 * | 10/2010 | Richards | A47F 5/135 |
| | | | | 211/195 |
| 8,528,918 | B2 * | 9/2013 | Macias | B62B 3/02 |
| | | | | 280/47.35 |
| 10,106,186 | B2 * | 10/2018 | Choi | C08K 5/00 |
| 10,173,705 | B2 * | 1/2019 | Tofflemire | B62B 3/04 |
| 10,280,002 | B2 * | 5/2019 | Giachero | B65G 1/14 |
| 10,807,793 | B2 * | 10/2020 | Byström | B63B 25/002 |
| 2009/0045154 | A1 * | 2/2009 | Gerstner | A61B 50/13 |
| | | | | 211/126.15 |
| 2017/0143571 | A1 * | 5/2017 | Wilson | B62B 3/004 |
| 2021/0309272 | A1 * | 10/2021 | Carboni | B62B 3/04 |

\* cited by examiner

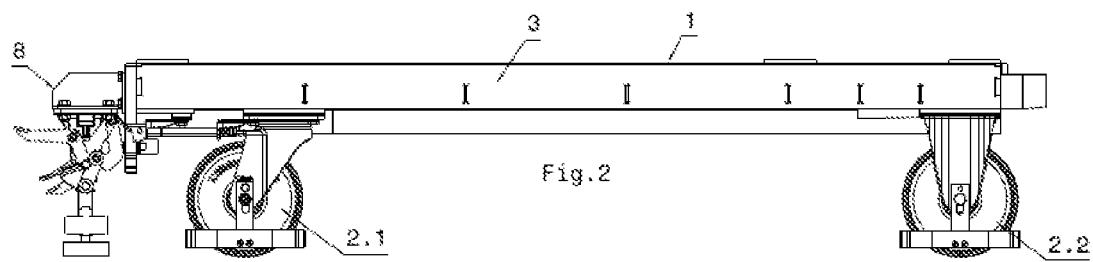
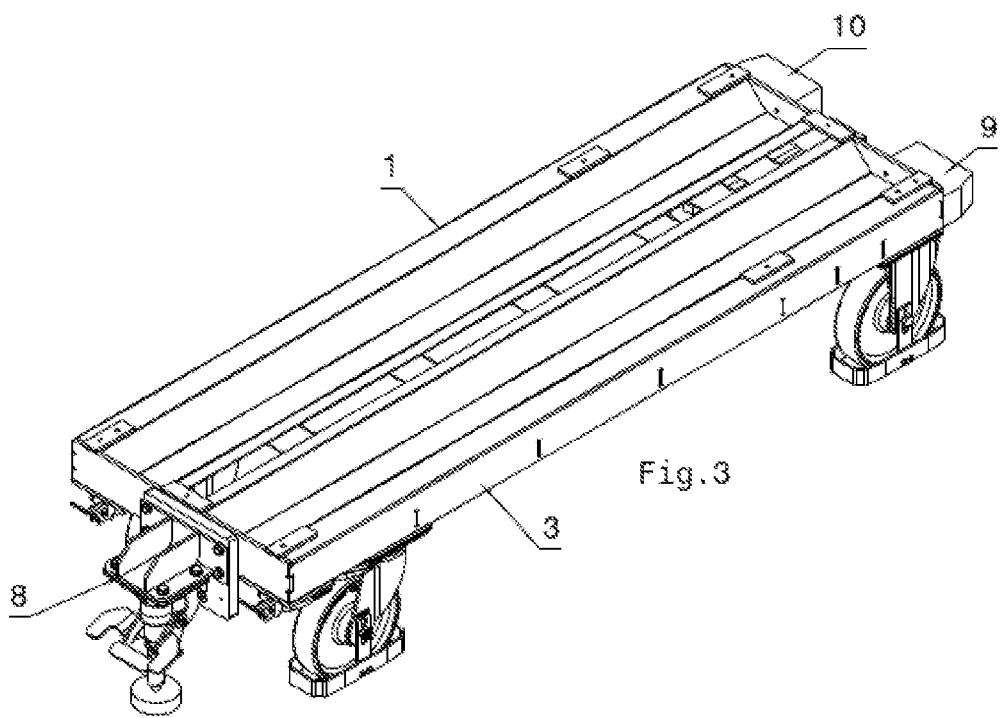

QUICK-CHANGE COMPONENT STORE FOR AUTO BODY PARTS

CROSS-REFERENCE TO RELATED APPLICATIONS

This application claims priority to German Patent Application Number DE 20 2021 104 136.6 filed on Aug. 3, 2021, the content of which is incorporated herein by reference in its entirety.

FILED OF TECHNOLOGY

The invention relates to a low-cost automation quick-change component store for auto body parts which are mounted in stacking columns on top of one another or on pawls or next to one another, as well as a corresponding system for presenting auto body parts and a stacking column for storing auto body parts and a pawl for placing auto body parts on top of one another or on top of one another for use in stacking columns.

BACKGROUND

State of the Art

Stacking columns are known in various forms and designs, and are commercially available. As a rule, they serve to receive stored goods, in particular body parts, e.g. after their production in a press, and to transport them to further processing stations.

The function of the stacking columns is usually the same. If an auto body part to be stored is introduced into a frame made up of several stacking columns, the lowest pawl lever pivots into a working position the auto body part is in contact, wherein the pawl levers each take a following pawl lever from a rest position into a ready position. The next auto body part to be introduced brings the following pawl lever from the ready position into the working position, in which the pawls hold the auto body part and pivot the following pawl into the ready position.

In most cases, these are vertical stacking columns, wherein the basic idea of the entrainment of the individual pawl levers or pawls is being shown in DE 38 11 310 C2. Two-armed pawl levers are rotatably mounted one above the other on columns, each of which has a supporting arm, which receives a stock, and a control arm, and can be pivoted out of a rest position via a standby position into a working position and back again, a pawl lever, which is located in the standby position, passing into its working position when a stock is placed on it and, at the same time, a pawl lever, which is arranged above it, is being pivoted by the control arm of the pawl lever arriving in working position out of a rest position into its standby position, wherein the pawl levers, which are in working position, lock one another in this position.

These stacking columns have proven to be excellent in practice. However, in order to store auto body parts, a plurality of stacking columns or similar holding devices must interact, which is usually done by constructing a plurality of stacking columns on a frame which is moved, for example, by means of a lifting stacker. In today's degree of automation in the production of auto body parts, in particular in the automotive industry, the movement of auto body parts usually takes place by means of robots, so that the exact alignment of the stacking column with respect to the robot is essential for the use of stacking columns. The stacking columns must have a constant vertical alignment and a constant spacing from one another so that parts to be stored or removed can be properly accommodated on the latches. It is therefore very difficult and time-consuming to construct a rack on site or to displace it, since the individual stacking columns must be aligned precisely. Even a deviation in the millimeter range when placed on a substrate causes a deviation in the centimeter range in the upper part of the stacking column. Above all, the inclination of stacking columns facing one another with their latches is also essential. As a rule, the construction of such a frame requires just as much time as the production of the entire frame.

BRIEF SUMMARY OF THE INVENTION

Task of the Invention

The task of the present invention is to provide a component store, a system, a stacking column as well as a latch which can be handled extremely flexibly and whose alignment is simple and extremely precise.

Solution for the Task

The solution is firstly that the stacking columns are arranged on a mobile carriage.

These components are intended to be used in particular in the production of bodywork components, in particular from sheet metal, in injection molding for metal inserts and as buffer storage for welding installations and machining centers. But these are just examples. A multiplicity of possible applications are conceivable and are to be comprised in the present invention.

The invention substantially simplifies the handling of the component store, since it can also be moved by hand. A fork-lift truck is not necessary any more, as a result of which the risk of damage to the stacking column or even to the auto body parts stored therein is minimized. Of course, the present invention also comprises the fact that the component store can be moved not by hand, but by a tractor, a rail vehicle or even self-propelled. Everything is possible here.

In a simple exemplary embodiment, the movable carriage consists of a base frame which can be moved on rollers. In this case, two rollers are preferably designed to be steerable, while the other two rollers can be stationary. This also supports the mobility of the carriage.

The carriage is preferably assigned a fixing device which corresponds to a parking brake. In other words, instead of a separate locking device, a braking device could also be assigned to at least one pair of wheels. For the sake of simplicity, however, the fixing device here has a fixing foot which can be lowered via a lever mechanism.

This component store can be used solely for the movement of auto body parts, but, in an extension of the present invention, it is intended to be part of an overall system with which, in particular, the component store is adjusted with the utmost precision with respect to loading and unloading robots. That is to say, according to the invention, the carriage is assigned a coordinate system which is preferably arranged fixedly, for example on a floor. This coordinate system provides, on the one hand, guide rollers for the component store and, on the other hand, roller blocks for its vertical levelling. The orientation of the component store in x and y direction should be standard, the orientation in z direction should be optional. Furthermore, a centering unit with corresponding roller guides is provided, which cooperates with a centering blade on the component store. This results in the most accurate alignment of the component store in the three coordinates of space; furthermore, the component store is also fixed in the centering unit by means of a variable tensioner.

According to the invention, it is contemplated to always use two carriages of identical construction in automation. In this way, a removal robot can always remove auto body parts from a component store, while the other component store is refilled in the meantime. The automation/system can thus run through without interruption. In the case of an auto body part change, the two component stores can be replaced by other component stores which are equipped for the new auto body park.

It is desirable to improve the accessibility of stacking columns of a component store. This is achieved in that at least a part of the stacking columns consists of two parts which are connected to one another in an articulated manner. That is to say, one part can be folded down with respect to the other part, so that the space behind this stacking column is thereby accessible. If the folded-down stacking column is then required, it can be erected again and fixed by appropriate clamping levers.

A further idea of the present invention relates to the pawl itself, since it proves advisable for some sensitive components to minimize the contact surface between the pawl and the auto body part. According to the invention, this is accomplished in that a point-shaped support for the auto body part is applied to the support surface of the pawl, which can be done, for example, by means of a flexible hemisphere. Here, too, many possibilities are conceivable which are to be comprised by the present invention.

These special latches are primarily intended for components made of aluminum.

The particular advantage of the present component store is that a large number of auto body parts can be provided in a small space with a high degree of accuracy for automated handling.

BRIEF DESCRIPTION OF THE DRAWINGS

Further advantages, features and details of the invention will be apparent from the following description of preferred embodiments and from the drawings; these show in:

FIG. 2 a side view of a carriage;

FIG. 3 a perspective view of the carriage according to FIG. 2;

DETAILED DESCRIPTION OF THE INVENTION

Figure 1:
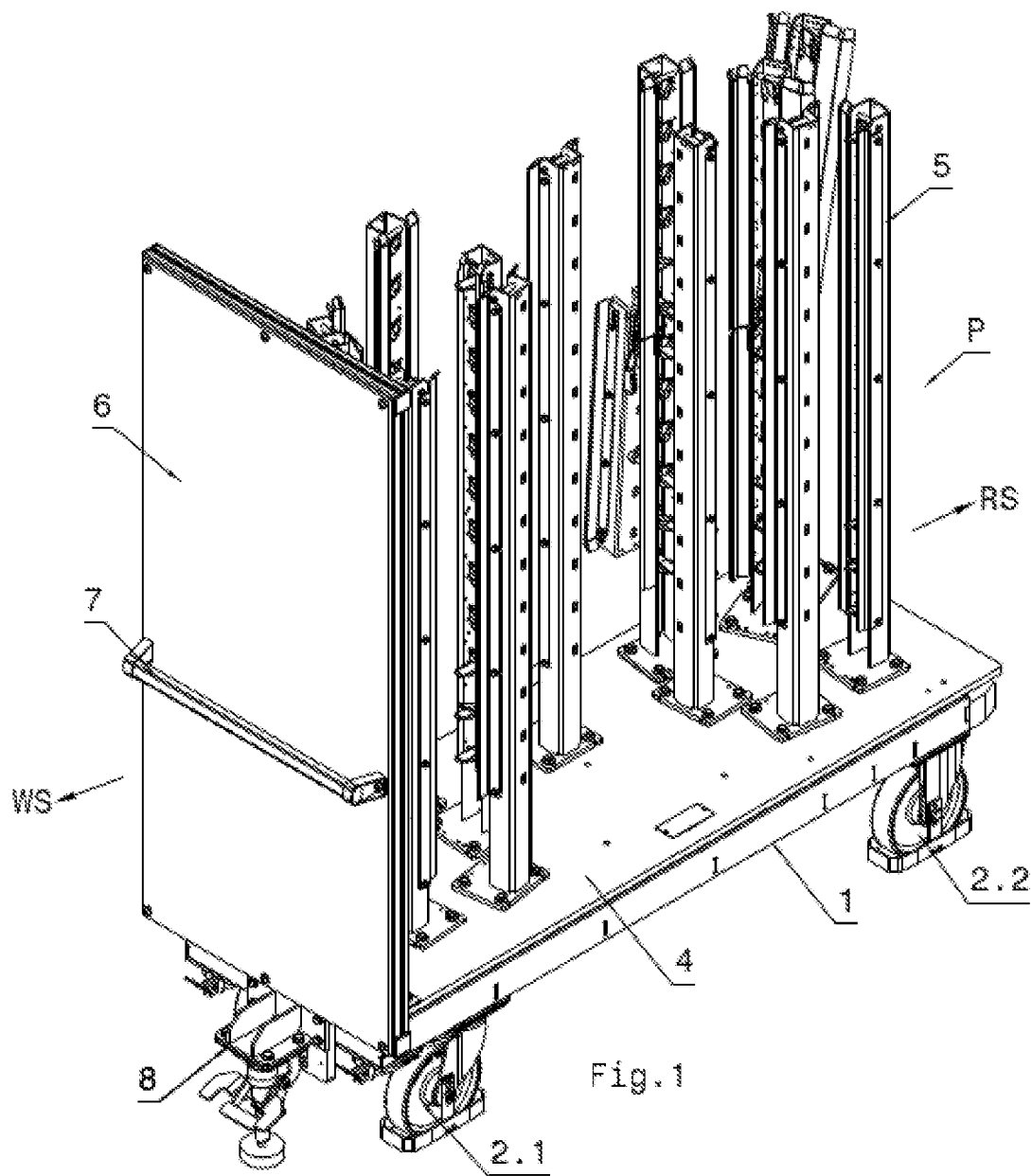
FIG. 1 a perspective view of a component store according to the invention.

According to FIG. 1, a component store P according to the invention has a carriage 1 on four wheels 2. A front pair of wheels 2.1 near a protective plate 6 or a locking device 8 is formed by swivel castors, while an opposite pair of wheels 2.2 is of fixed design.

This carriage 1 has a base frame 3 on which lies a plate 4. Stacking columns 5 protrude from the plate 4. At the front, that is to say from the side of the workers, the protective plate 6, on which a handle 7 is arranged, strikes against the carriage 1. The fixing device 8, which is described in greater detail in FIG. 4, can be seen below the protective plate 6.

A left and a right levelling block 9 and 10, respectively, are provided on the end faces of the frames 3 opposite the fixing device 8.

Figure 4:
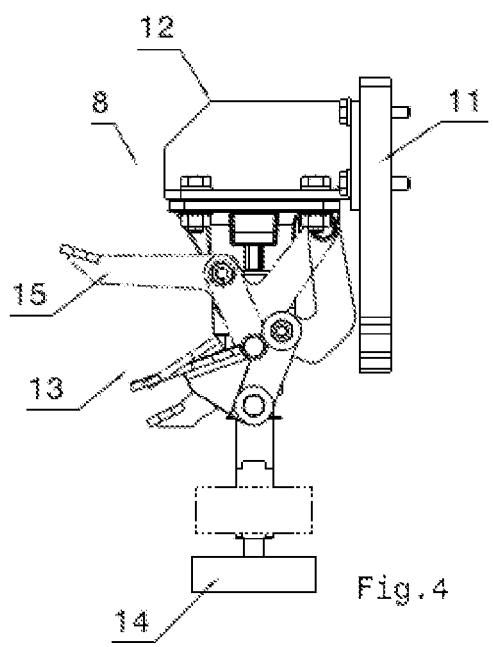
FIG. 4 a side view of a locking foot for the carriage according to FIG. 2.

According to FIG. 4, the fixing device 8 is connected to the base frame 3 via a stop plate 11. Projecting from this stop plate 11 is a bracket 12, on which a lever mechanism 13 is arranged, which permits a lowering and a lifting of a fixing foot 14, which is illustrated by dash-dotted lines. A corresponding locking lever 15, which can be operated with a foot, is indicated by dash-dotted lines in its open position and by solid lines in its locked position.

Figure 5:
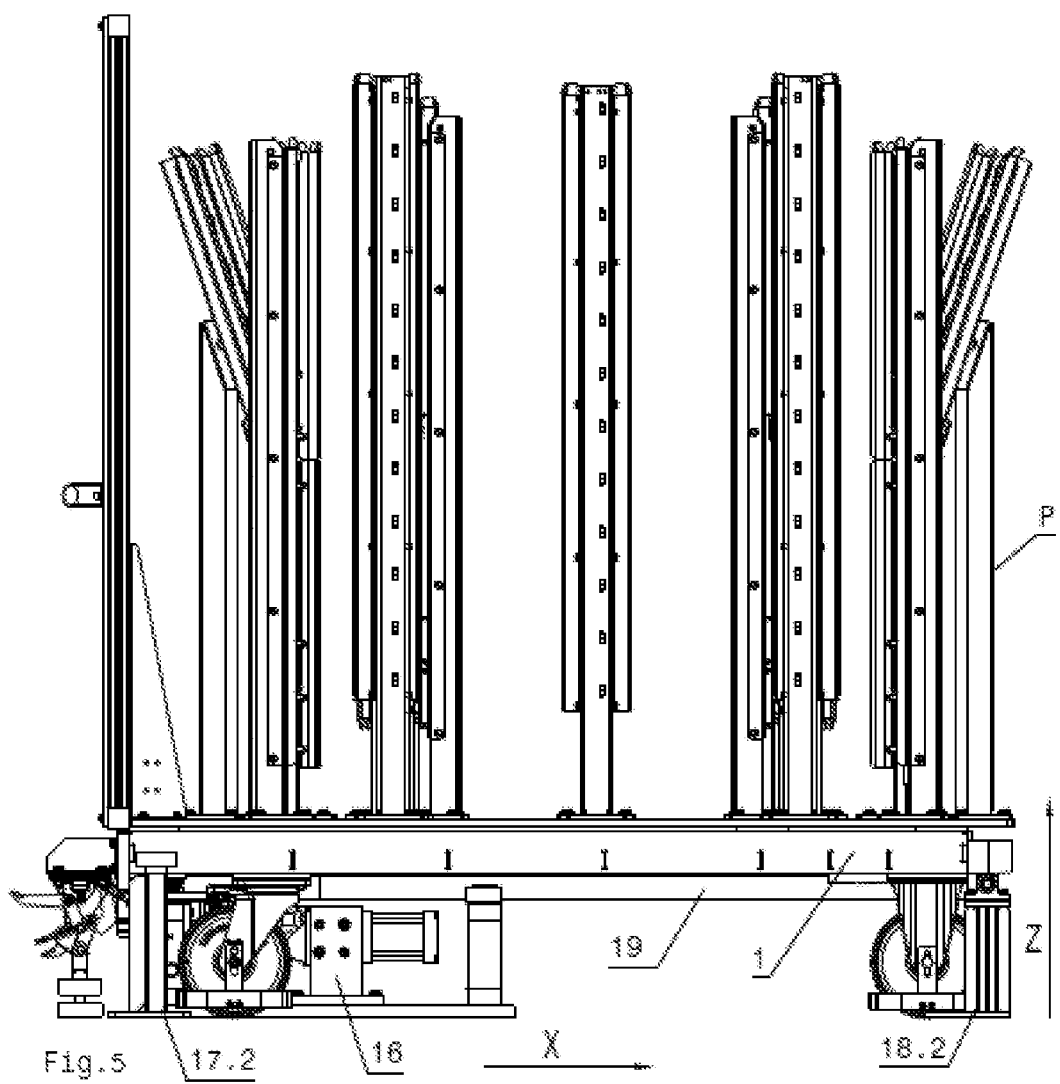
FIG. 5 a side view of the component store according to FIG. 1 with parts of a coordinate system according to the invention.
Figure 6:
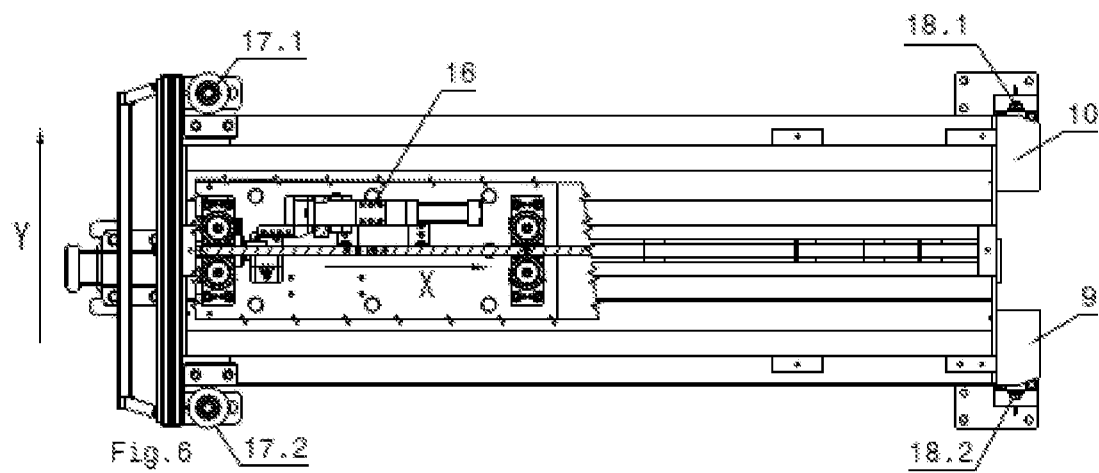
FIG. 6 a top view of the partially broken-open carriage according to FIG. 5.
Figure 7:
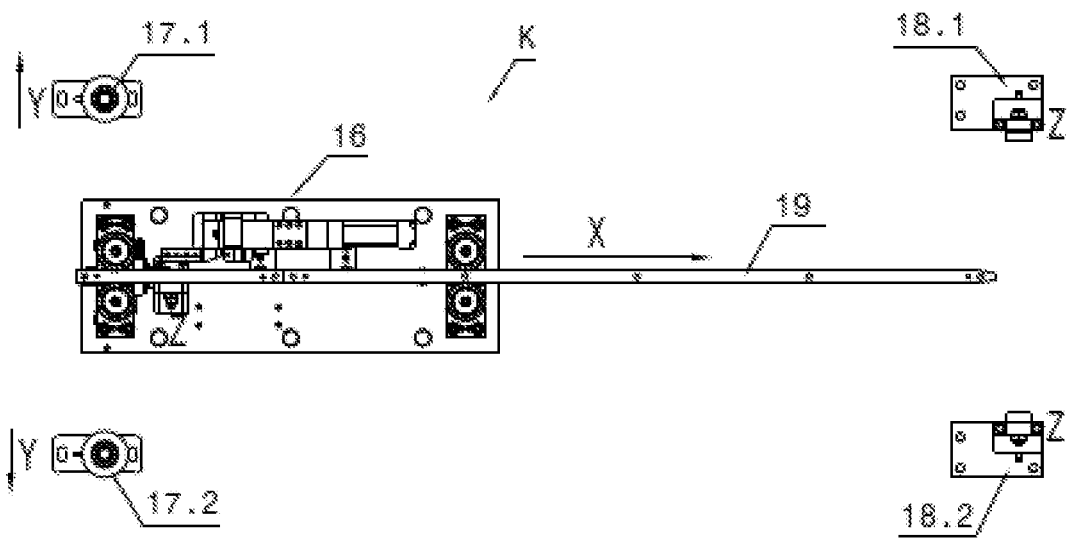
FIG. 7 a plan view of a ground-fixed coordinate system according to the invention.

The system according to the invention for presenting auto body parts includes, on the one hand, according to FIG. 5, the component store P and, on the other hand, a coordinate system K which is fixed to the ground and is shown in FIG. 7. The coordinate system K has a centering unit 16 and worker-side guide rollers 17.1 and 17.2 arranged in a rectangle around the centering unit 16, as well as opposite roller blocks 18.1 and 18.2. The guide rollers 17.1 and 17.2 and the roller blocks 18.1 and 18.2 serve to align the carriage 1 in the plane and in the vertical direction.

Figure 8:
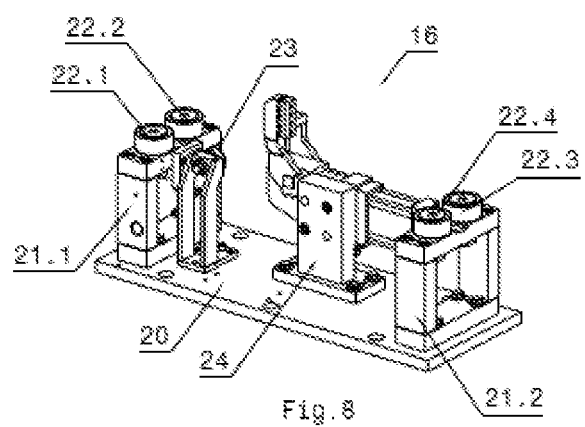
FIG. 8 a perspective side view of a component from the coordinate system according to FIG. 7.

The centering unit 16 cooperates with a centering blade 19 which is arranged on the floor of the carriage 1. Furthermore, according to FIG. 8, the centering unit 16 has a base plate 20 on which cam rollers 22.1 to 22.4 are arranged opposite one another on corresponding frames 21.1 and 21.2. Between the frames 21.1 and 21.2 there is again a levelling roller 23 for the vertical adjustment of the carriage 1.

Furthermore, a variable tensioner 24 is provided on the base plate 20.

Figure 9:
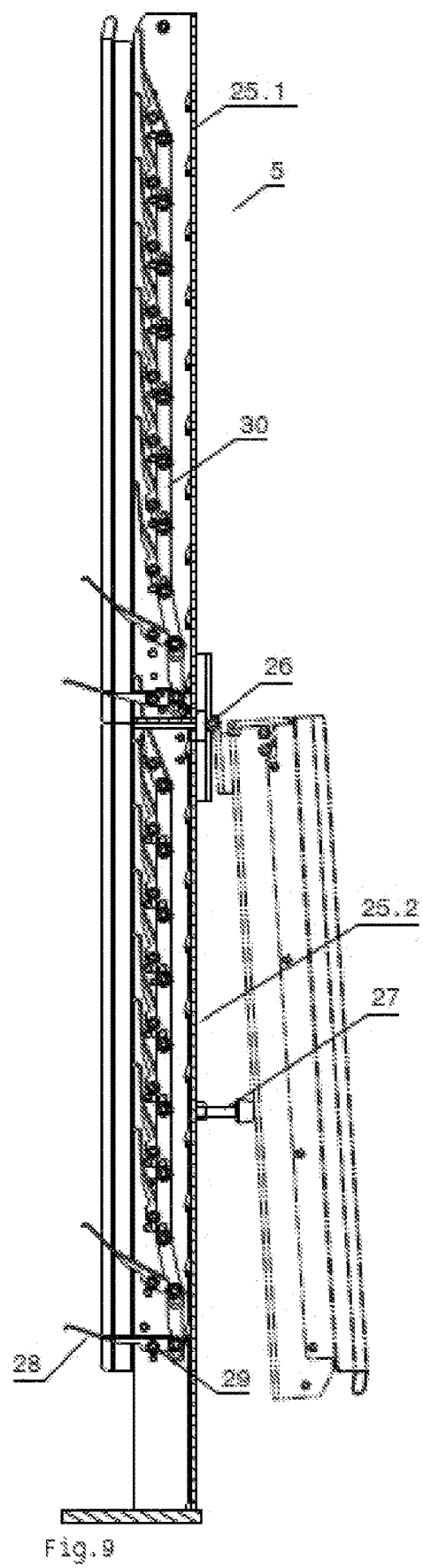
FIG. 9 a side view of a fold-down stacking column according to the invention.

According to FIG. 9, a stacking column 5 according to the invention consists of two parts 25.1 and 25.2. Both parts 25.1 and 25.2 are connected to each other by a joint 26, so that the part 25.1 can be rotated about the joint 26 into its position indicated by the dashed dot. In the end position, it is supported against a stop 27 which projects from the part 25.2.

Apart from that, a plurality of pawls 28 are located in the stacking column 5, which pawls can be rotated around an axis 29 from a rest position into a standby position and then into a working position, as is known from the prior art. For this purpose, they are connected to one another via a corresponding actuating line 20.

Figure 10:
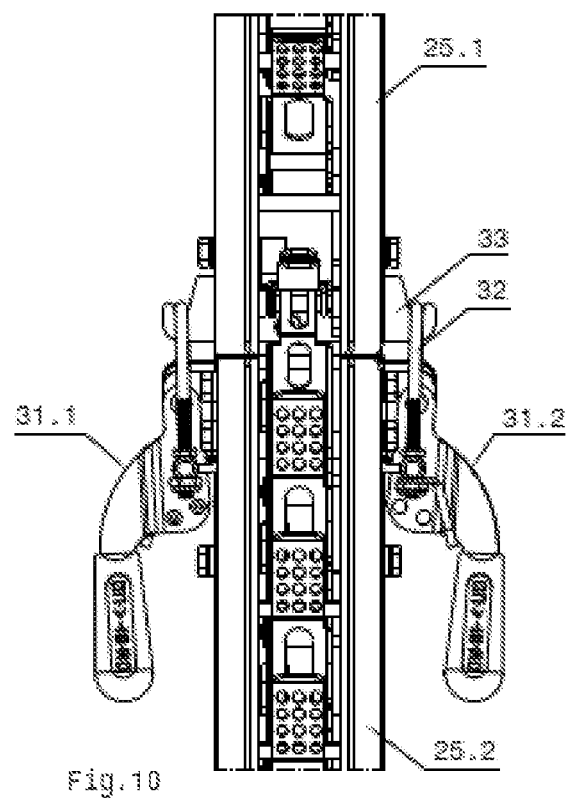
FIG. 10 an enlarged detail of the stacking column according to FIG. 9.

In order to connect the two parts 25.1 and 25.2 in vertical alignment, commercially available clamping levers 31.1 and 31.2 are provided according to FIG. 10, which are fixed to the part 25.2 and can be hooked into hooks 33 by means of loops 32, these hooks 33 being fixed to the hinged part 25.1.

Figure 11:
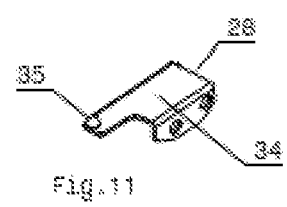
FIG. 11 an enlarged perspective side view of a pawl according to the invention.

In a pawl 28 according to the invention, a point-shaped support 35 is to be provided on a receiving surface 34 for supporting the auto body part, as shown in FIG. 11. For example, this point support 35 may comprise a hemispherical body so that the contact area between the pawl 28 and the auto body part is reduced to a minimum.

The mode of operation of the present invention is as follows:

A component store P, as shown in FIG. 1, is moved on the robot side, as indicated by the arrow RS, to, for example, a press for producing body parts and is centered there, so that a robot can remove corresponding auto body parts from the press and transfer them between the stacking columns 5.

As soon as the component store P has been correspondingly loaded, it is moved away by the manufacturer WS and, for example, delivered to a further machining station for the auto body parts. There, the auto body parts can again be removed by a robot and transferred to a machining station.

For the most accurate centering possible of the component store P with respect to both the loading robot and the unloading robot, the component store P moves with its centering sword 19 into the centering unit 16 of the corresponding coordinate system K, with a corresponding coordinate system K preferably being assigned to both the loading robot and the unloading robot. The cam rollers 22.1 to 22.4 in cooperation with the guide rollers 17.1 and 17.2 align the component store P in its horizontal position and fix it by the variable tensioner 24. This variable tensioner 24 has, for example, a lever which can be rotated around an axis by a corresponding pneumatic device. When the carriage travels over it, this lever lies in the horizontal and is then pivoted into the vertical, it striking, for example, a transverse tube below the carriage and being able to press the carriage, for example, against the roller blocks 18.1 and 18.2. Of course, other stops are also conceivable. In this way, the component store P is secured. The alignment in vertical position is done by the levelling roller 23 and the two roller blocks 18.1 and 18.2, which cooperate with the levelling blocks 9 and 10 of the component storage unit P.

A further fixing of the component store P is then effected by actuating the fixing device 8 and by lowering the fixing foot 40.

| List of reference numerals | |
| --- | --- |
| 1 | Trolley |
| 2 | Wheel |
| 3 | Base frame |
| 4 | Plate |
| 5 | Stacking column |
| 6 | Protective plate |
| 7 | Handle |
| 8 | Locking device |
| 9 | Levelling block |
| 10 | Levelling block |
| 11 | Stop plate |
| 12 | Console |
| 13 | Lever mechanism |
| 14 | Locking foot |
| 15 | Locking lever |
| 16 | Centring unit |
| 17 | Guide roller |
| 18 | Roller block |
| 19 | Centring sword |
| 20 | Base plate |
| 21 | Frame |
| 22 | Cam follower |
| 23 | Levelling roller |
| 24 | Variable tensioner |
| 25 | Part |
| 26 | Hinge |
| 27 | Stopper |
| 28 | Pawl |
| 29 | Axis |
| 30 | Actuating line |

| List of reference numerals -continued | |
| --- | --- |
| 31 | Clamping lever |
| 32 | Loop |
| 33 | Hook |
| 34 | Mounting surface |
| 35 | Support |
| 36 | Stiffening angle |
| 37 | |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| K | Coordinate system |
| RS | robot side |
| P | Component storage |
| WS | worker side |

I claim:

1. A component storage device (P) for auto body parts, comprising:
a movable trolley (1);
a plurality of stacking columns (5) extending vertically upward from the movable trolley (1), wherein at least one of the stacking columns (5) further comprises:
a first stacking column part (25.1), and
a second stacking column part (25.2), wherein the at least one of the stacking columns (5) has a height, and wherein the first stacking column part and the second stacking column part in combination define the height, and wherein the first stacking column part (25.1) is connected to the second stacking column part (25.2) by a rotatable joint (26), wherein the first stacking column part (25.1) is configured to rotate and fold downward via the rotatable joint (26) such that the first stacking column part (25.1) rests against the second stacking column part (25.2) when rotated and folded downward, wherein the system comprises a coordinate system (K) assigned to the movable trolley (1), and a centering unit (16) fixed to the ground.

2. The component storage device according to claim 1, wherein the movable trolley (1) comprises:
a base frame (3);
a base plate (4) coupled on top of the base frame (3), wherein the plurality of stacking columns (5) extend vertically upward from the base plate (4); and
a plurality of wheels (2) coupled to an underside of the base frame (3).

3. The component storage device according to claim 2, wherein the plurality of wheels (2) further comprises:
   steering wheels (2.1) coupled to a front end of the base frame (3), and
   fixed wheels (2.2) coupled to a back end of the base frame (3) opposite the front end.

4. The component storage device according to claim 1, wherein the movable trolley (1) further comprises a fixing foot (14) coupled to a front end of the movable trolley (1).

5. The component storage device according to claim 4, wherein the movable trolley (1) further comprises a lever mechanism (13) configured to lower the fixing foot (14) to secure the movable trolley (1).

6. The component storage device according to claim 2, further comprising a protective plate (6) projecting upwards from a front end of the base plate (4) of the movable trolley (1), wherein the protective plate (6) further comprises a handle (7).

7. The component storage device according to claim 6, wherein the protective plate (6) is connected to the base plate (4) via stiffening angles (36).

8. The system according to claim 1, wherein the movable trolley (1) further comprises a centering blade (19) coupled to an underside of the movable trolley (1), wherein the centering blade (19) extends longitudinally, and wherein the centering blade (19) is configured to interact with the centering unit (16) to center the component storage device (P).

9. The system according to claim 8, wherein the coordinate system (K) comprises guide rollers (17.1, 17.2) and/or roller blocks (18.1, 18.2) for vertical leveling.

10. The system according to claim 8, wherein the centering unit (16) comprises cam rollers (22.1-22.4) configured to receive the centering blade (19).

11. The component storage device according to claim 1, further comprising tensioning levers (31.1, 31.2) configured to connect the first stacking column part (25.1) to the second stacking column part (25.2) and to prevent the first stacking column part (25.1) from rotating and folding with respect to the second stacking column part (25.2).

12. The component storage device according to claim 1, further comprising a plurality of pawls (28) coupled to the stacking columns (5), wherein each of the pawls (28) comprises a receiving surface (34) configured to receive at least one auto body part.

13. A component storage device (P) for auto body parts, comprising:
   a movable trolley (1);
   a plurality of stacking columns (5) extending vertically upward from the movable trolley (1), wherein at least one of the stacking columns (5) further comprises:
      a first stacking column part (25.1), and
      a second stacking column part (25.2), wherein the at least one of the stacking columns (5) has a height, and wherein the first stacking column part and the second stacking column part in combination define the height, and wherein the first stacking column part (25.1) is connected to the second stacking column part (25.2) by a rotatable joint (26), wherein the first stacking column part (25.1) is configured to rotate and fold downward via the rotatable joint (26) such that the first stacking column part (25.1) rests against the second stacking column part (25.2) when rotated and folded downward, and further comprising a plurality of pawls (28) coupled to the stacking columns (5), wherein each of the pawls (28) comprises a receiving surface (34) configured to receive at least one auto body part, wherein the receiving surface (34) comprises a hemisphere-type support (35) for receiving the at least one auto body part.

14. A system for presenting auto body parts using the component storage device (P) according to claim 13, wherein the system comprises a coordinate system (K) assigned to the movable trolley (1), and a centering unit (16) fixed to the ground.

* * * * *